United States Patent
Philp

(10) Patent No.: US 6,815,026 B2
(45) Date of Patent: Nov. 9, 2004

(54) HELICALLY-WOUND DUCT

(76) Inventor: Perry Philp, 75 Mary Street, Unit 7, Aurora, Ontario (CA), L4G 1G3

( * ) Notice: Subject to any disclaimer, the term of this patent is extended or adjusted under 35 U.S.C. 154(b) by 0 days.

(21) Appl. No.: 10/289,283

(22) Filed: Nov. 7, 2002

(65) Prior Publication Data

US 2004/0091656 A1 May 13, 2004

(51) Int. Cl.$^7$ .................................................. F16L 9/14
(52) U.S. Cl. ..................... 428/36.91; 138/129; 138/139; 138/149; 138/153; 138/154; 428/37; 428/192; 428/194
(58) Field of Search ................................ 428/36.91, 37, 428/192, 194; 138/149, 129, 139, 153, 154

(56) References Cited

U.S. PATENT DOCUMENTS

| | | | |
|---|---|---|---|
| 3,739,815 A | 6/1973 | Rejeski | |
| 3,861,424 A | 1/1975 | Mizutani et al. | |
| 3,885,594 A | 5/1975 | Tanaka | |
| 3,891,007 A | 6/1975 | Kleykamp | |
| 3,993,060 A | 11/1976 | Mitchell | |
| 4,098,298 A | 7/1978 | Vohrer | |
| 4,120,628 A | 10/1978 | Simos | |
| 4,204,562 A | 5/1980 | Kelly | |
| 4,233,097 A | 11/1980 | Stahl | |
| 4,304,266 A | 12/1981 | Kutnyak et al. | |
| 4,383,554 A | 5/1983 | Merriman | |
| 4,515,397 A | 5/1985 | Nowobilski et al. | |
| 4,581,478 A | 4/1986 | Pugh et al. | |
| 4,690,174 A | 9/1987 | Jarvenkyla | |
| 4,869,295 A | 9/1989 | Keldany | |
| 5,305,800 A | 4/1994 | Kolberg | |
| 5,526,849 A | 6/1996 | Gray | |
| 5,645,110 A | 7/1997 | Nobileau | |
| 6,076,561 A * | 6/2000 | Akedo | 138/149 |
| 6,152,186 A | 11/2000 | Arney et al. | |
| 6,244,303 B1 | 6/2001 | Adams | |
| 6,253,793 B1 | 7/2001 | Dupoiron et al. | |
| 6,305,428 B1 | 10/2001 | Nakamura et al. | |
| 6,374,864 B1 | 4/2002 | Philp | |

* cited by examiner

Primary Examiner—Nasser Ahmad
(74) Attorney, Agent, or Firm—Bereskin & Parr

(57) ABSTRACT

A duct formed from at least one helically wound strip of flexible material and at least one stiffening element. Stiffening element has a ratio of radial height to axial length of greater than 1.0. The stiffening element may be substantially planar.

6 Claims, 6 Drawing Sheets

HELICALLY-WOUND DUCT

FIELD OF THE INVENTION

This invention relates to ducts, and in particular, to helically wound flexible ducts having a stiffening element.

BACKGROUND OF THE INVENTION

Helically wound flexible ducts are used in many industrial and commercial applications to transport gases, especially in the field of HVAC systems. Typically, these ducts are constructed by helically winding a stiffening element with a flexible strip of material to form a helically-wound duct. In some industrial applications, the ducts are placed in environments which require gases to be transported through confined spaces and around corners. These ducts must be sufficiently flexible to navigate through the confined spaces, while still providing adequate structural strength to support the transport of gases. In some commercial applications, such as an upright vacuum cleaner, the ducts must be capable of being axially compressed so as to fit in small storage compartments. In use, the ducts must be capable of being axially expanded to vacuum items that cannot be reached by the main vacuuming head, such as stairs, curtains etc., while providing impact resistance and radial strength under vacuum pressure.

These concerns are addressed to some extent by a duct comprised of a helically wound stiffening element having a circular cross-section. However, these ducts are typically unable to provide a combination of sufficient radial strength and compressibility for most industrial and commercial applications. For instance, a duct comprising of a stiffening element with a large circular cross-section has considerable radial strength but limited axial compressibility and flexibility. Consequently, the poor compressibility of these ducts would necessitate the use of large shipping containers and would make handling and installation in confined spaces difficult. Conversely, a duct with a stiffening element having a small circular cross-section would provide significant axial compressibility and flexibility but inadequate radial strength. When used under vacuum pressures, these ducts are prone to radial collapse.

Accordingly, there is a need for a duct having a stiffening element with a profiled cross-section that is capable of being axially compressed to fit in a confined space while still providing adequate radial strength to support the transport of fluids and withstand impact stresses.

SUMMARY OF THE INVENTION

The present invention is directed to a duct having at least one helically wound strip of flexible material and at least one stiffening element. The helically wound strip has a leading edge and a trailing edge which overlap one another on adjacent convolutions of the strip and are bonded together to form a helical seam. The stiffening element extends helically along the helical seam. The stiffening element has an axial length and radial height and the ratio of the radial height to axial length is greater than 1.0.

In a preferred embodiment, the ratio of the radial height to axial length is greater than 2.0. The ratio of the radial height to axial length may also be greater than 3.0. The stiffening element may be substantially planar. The stiffening element may also be formed from a metallic or non-metallic material.

BRIEF DESCRIPTION OF THE DRAWINGS

For a better understanding of the present invention and to show clearly how it may be carried into effect, reference will now be made, by way of example, to the accompanying drawings which show a preferred embodiment of the present invention and in which.

DETAILED DESCRIPTION OF THE INVENTION

Figure 1:
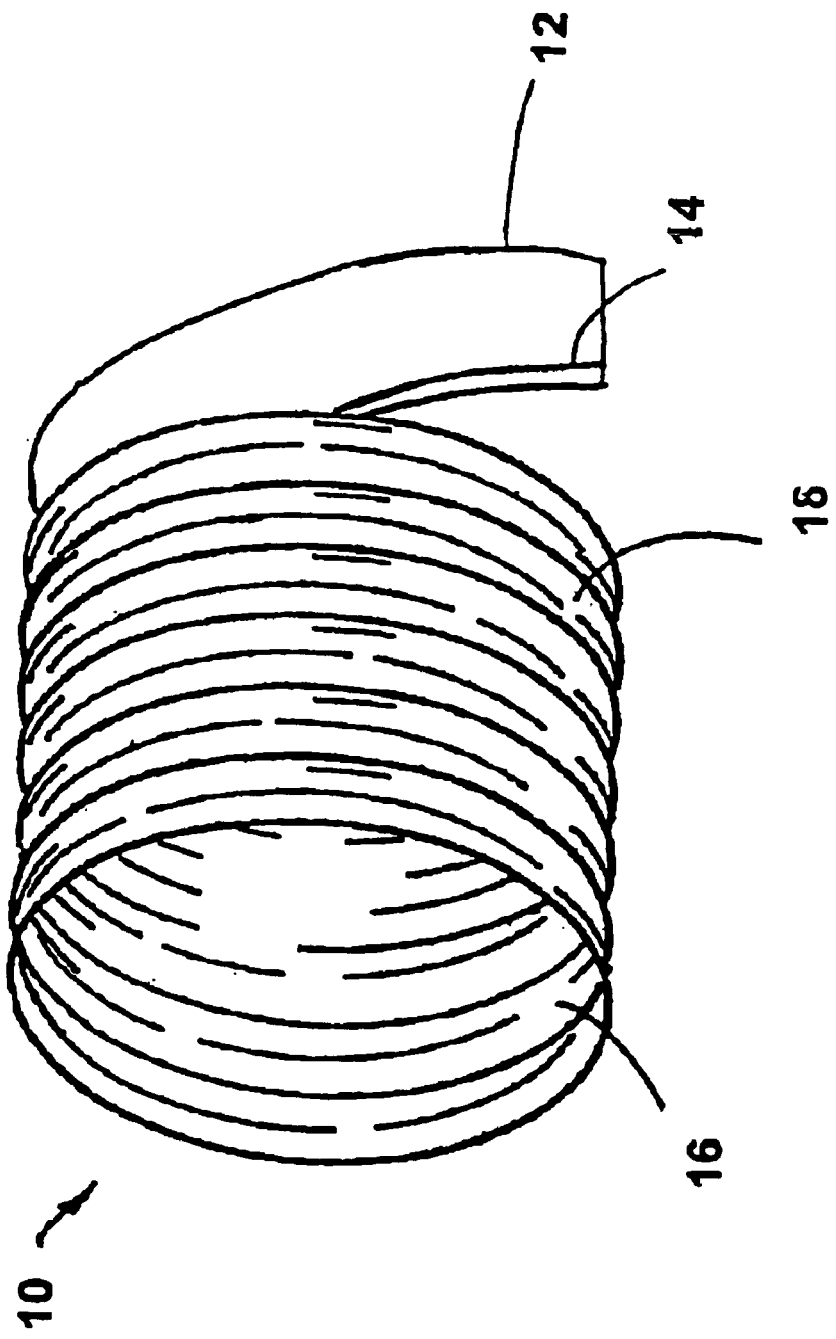
FIG. 1 is a perspective view of a duct made in accordance with an embodiment of the invention.

Reference is made to FIGS. 1, 2, 3 and 5 which illustrate a duct 10 made in accordance with a first embodiment of the invention. Duct 10 is a helically-wound duct made from a generally rectangular strip 12 of a flexible material and a helical stiffening element 14. Strip 12 is helically wound to form a tube having an inner surface 16 and an outer surface 18. Strip 12 may be formed of any suitable material, as for example, synthetics, plastics or elastomeric materials.

Figure 2:
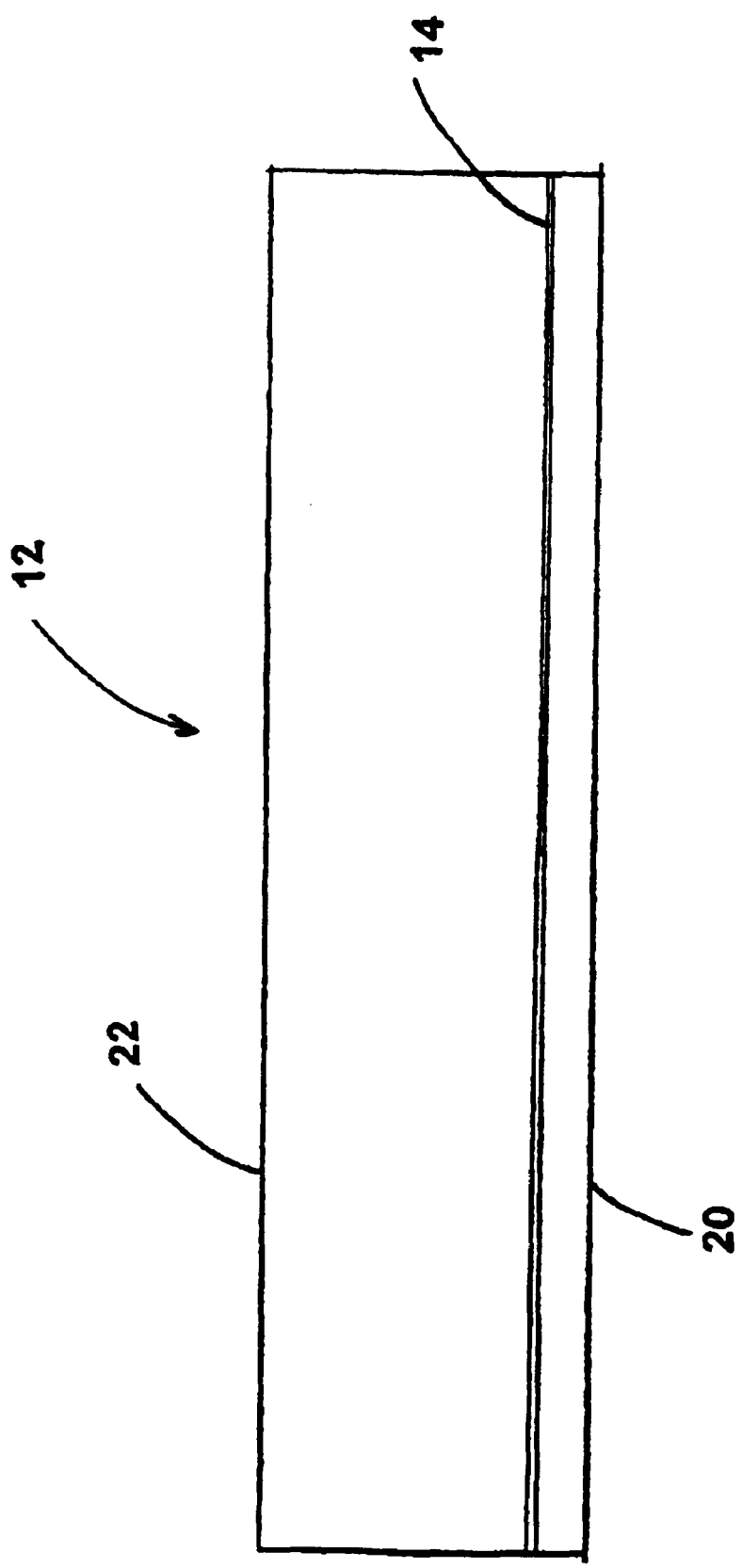
FIG. 2 is a top plan view of a strip of material which may be used to create the duct of FIG. 1.

Referring to FIG. 2, strip 12 has a leading edge 20 and a trailing edge 22. Stiffening element 14 may be positioned longitudinally anywhere between leading edge 20 and trailing edge 22, although it is preferably positioned adjacent to either leading edge 20 or trailing edge 22. The stiffening element 14 provides structural integrity for the duct.

Figure 3:
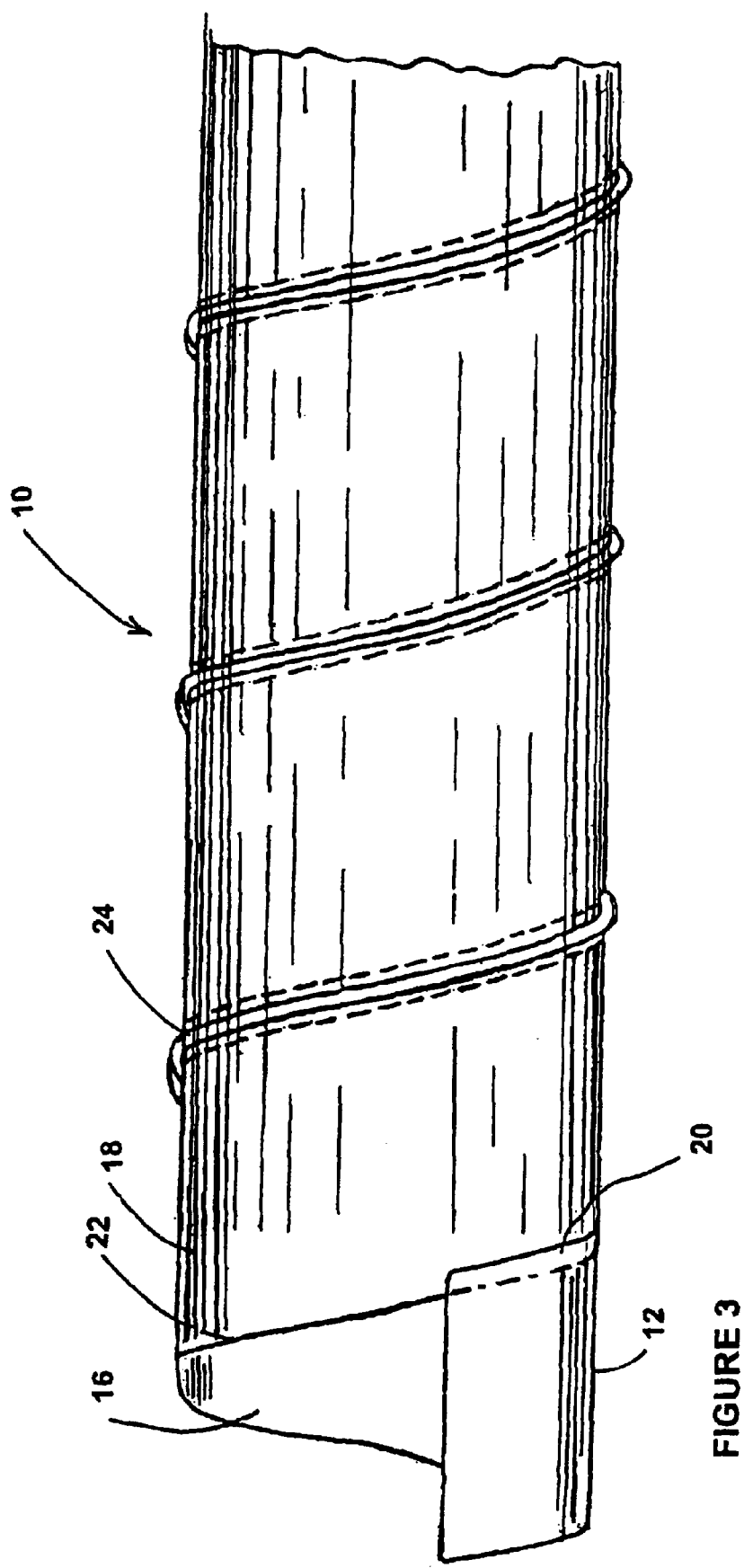
FIG. 3 is an enlarged elevational view of the duct of FIG. 1.

Reference is made to FIG. 3 which shows strip 12 as wound into a section of duct 10. Strip 12 is wound in a helical pattern through a helical winder as known in the art. The helical winder forms strip 12 into a helical pattern and causes the inner surface 16 of leading edge 20 of a helix of strip 12 as it emerges to overlap the outer surface 18 of trailing edge 22 of a succeeding convolution of a helix of strip 12 that has already passed through the winder. Leading edge 20 and trailing edge 22 of adjacent convolutions of helically wound strip 12 are bonded, by any means known in the art, to form a seam 24.

Figure 4:
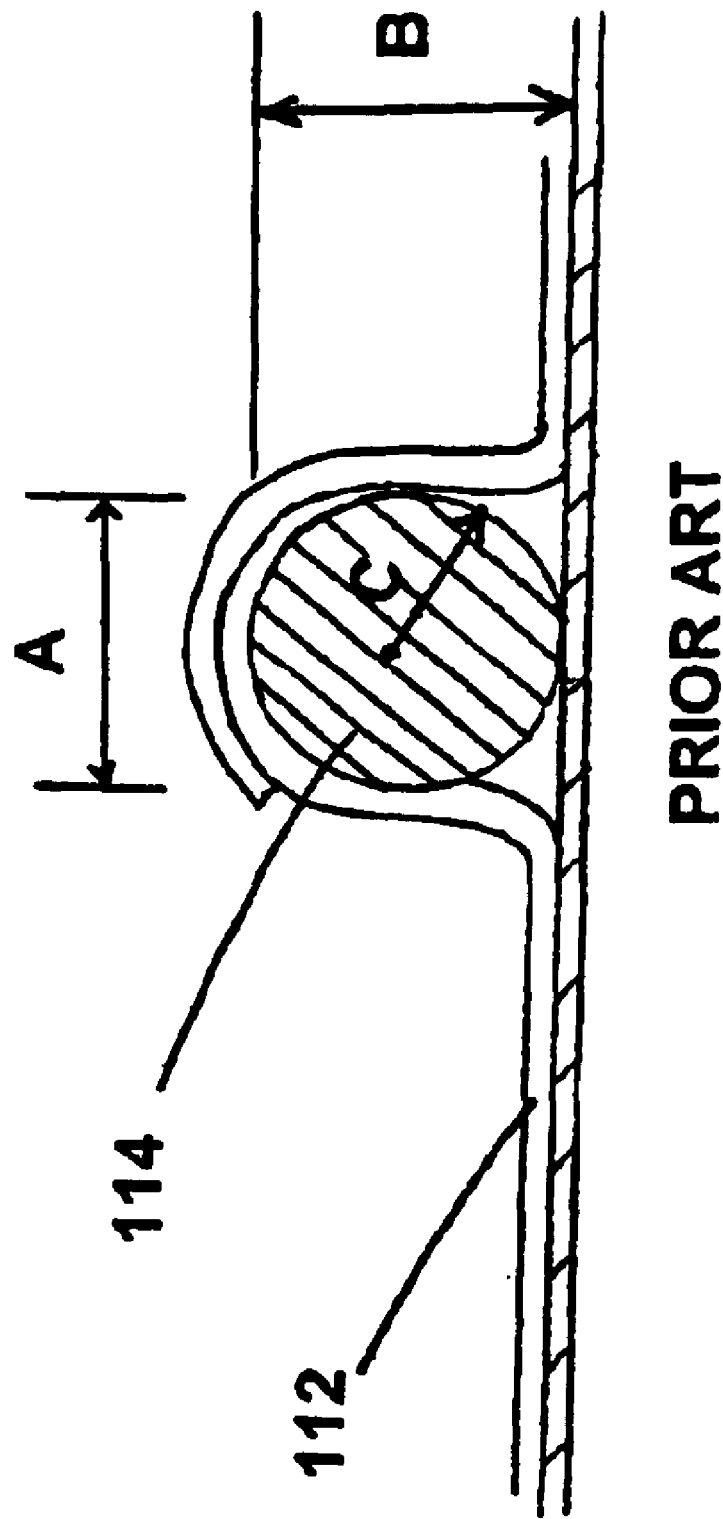
FIG. 4 is a sectional view of the seam of a prior art duct.

FIG. 4 shows a prior art duct 110. The duct has strip 112 of a flexible material and a stiffening element 114. Stiffening element 114 is a reinforcing wire having a circular cross-section and radius C. The axial length X and radial height Y of the stiffening element 114 are each 2C. When a radial height of 2C is selected to provide the desired radial compression strength, the resulting axial length of 2C limits the axial compression of the duct.

Figure 5:
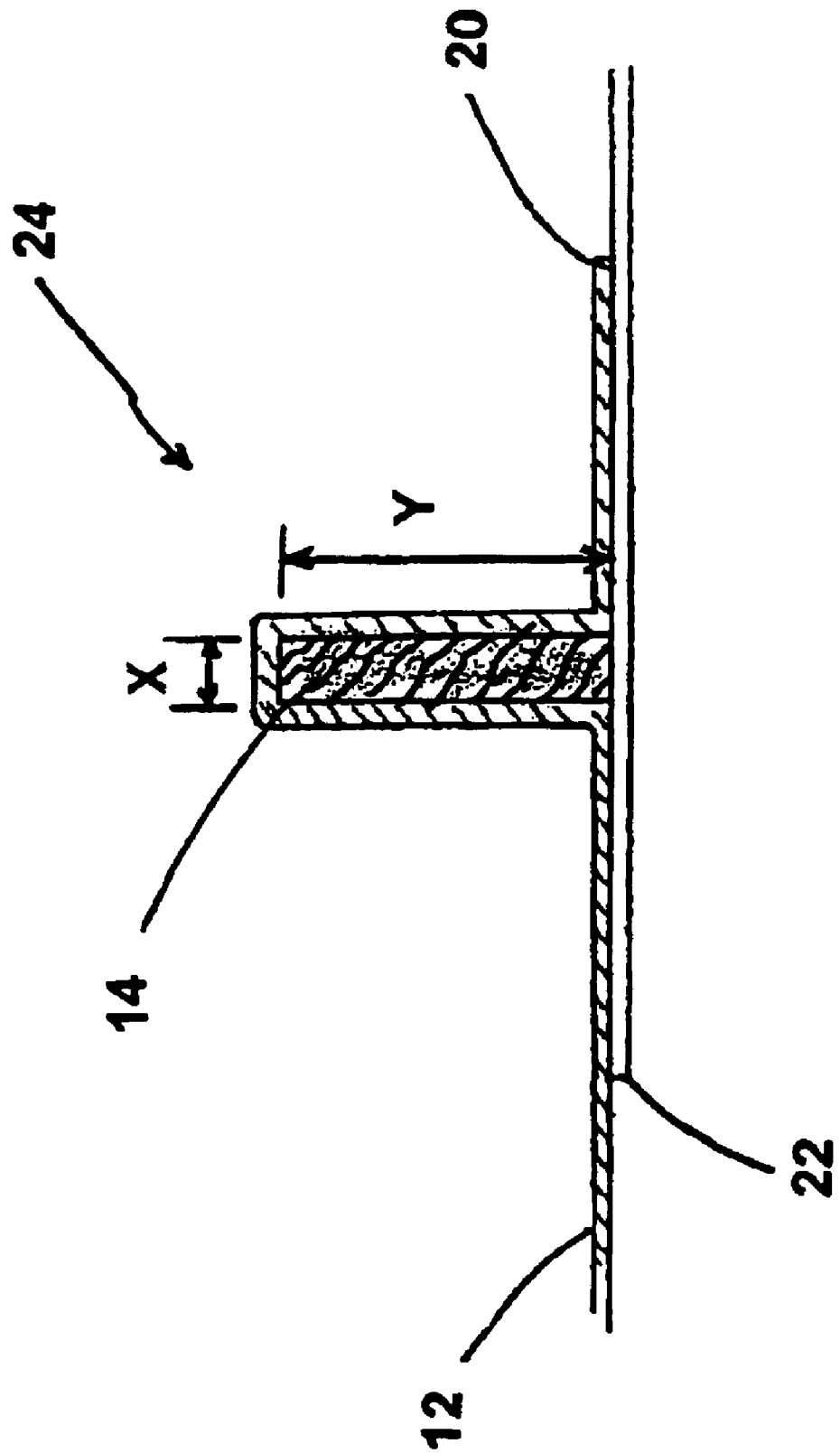
FIG. 5 is a sectional view of the seam of the duct of FIG. 1.

FIG. 5 illustrates a duct comprising a stiffening element having a more efficient cross-section. Seam 24 encloses stiffening element 14 and secures the overlapping leading and trailing edges 20, 22 of strip 12 to one another to form a helically wound duct. Stiffening element 14 extends helically along seam 24 and comprises a profiled cross-section having an axial length X and a radial height Y. Radial height Y is greater than axial length X. In use, stiffening element 14 functions like a "beam". The stresses applied to the beam cross-section are typically along the radial direction of the duct. These stresses are most often in compression when the duct is used to draw gases, such as on the suction side of HVAC systems.

The stiffening element 14 is also more efficient in radial tension, as when the duct is pressurized in the supply side of a HVAC system, for example. For a given cross-sectional area, stiffening element 14 will be most effective in either radial tension or compression, the greater the ratio of Y to X. Hence, radial height Y should be greater than axial length X so that the ratio of Y to X is greater than 1.0, more preferably at least 2.0. Most preferably the ratio of Y/X is equal to or greater than 3.0 as this provides very good radial strength for the amount of stiffener material used. This also provides good axial compressibility.

The increased radial strength provided by stiffening element 14 also resists deformation or "narrowing" of the circular cross-section of duct 10 during installations around corners or in confined spaces. Eliminating deformations in the circular cross-section of duct 10 helps maintain the design efficiencies of the HVAC system, and maximizes airflow through the duct.

Preferably, stiffening element 14 is formed by cold rolling a round spring wire to the desired radial height Y and axial length X. However, any method known in the art may be used to form the stiffening element 14. Stiffening element 14 is also preferably manufactured from galvanized spring wire, but can also be made from any metallic or non-metallic materials, as for example, aluminum, an alloy, nylon or rubber. The stiffener may also be made from suitable plastics which can be extruded in a cross-section as described herein.

Figure 6:
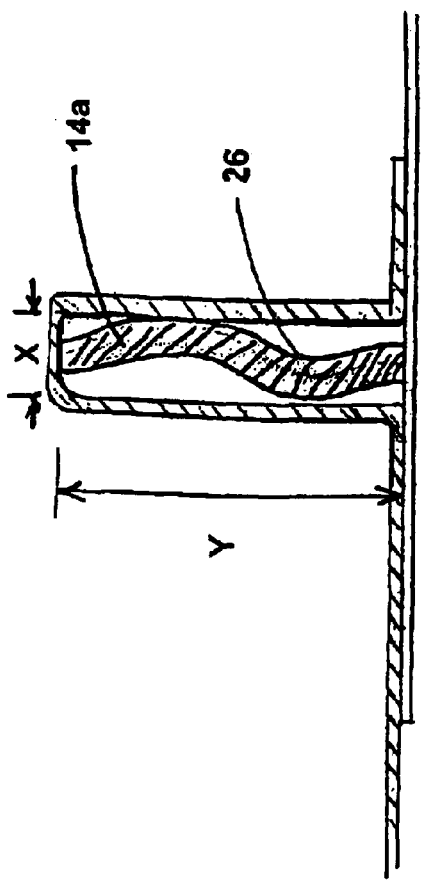
FIG. 6 is a sectional view of the seam of a duct with a first alternate stiffening element.
Figure 7:
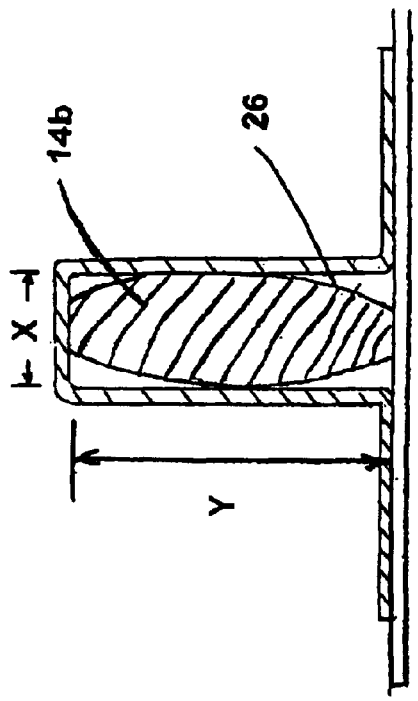
FIG. 7 is a sectional view of the seam of a duct with a second alternate stiffening element.
Figure 8:
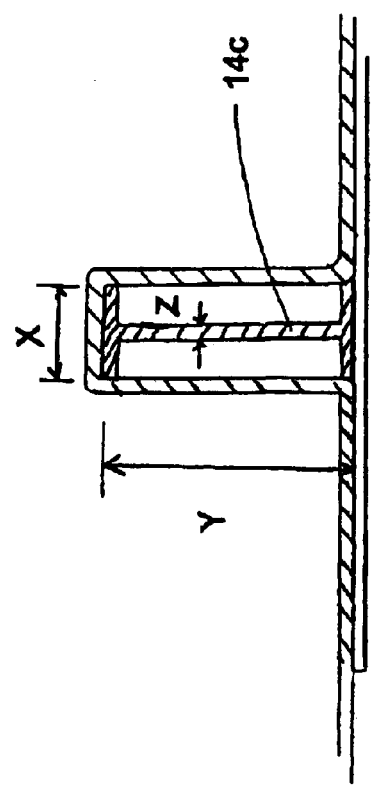
FIG. 8 is a sectional view of the seam of a duct with a third alternate stiffening element.

The stiffening element can have various cross-sections. FIGS. 6, 7 and 8 illustrate a first, second and third alternate stiffening element 14a, 14b and 14c. Referring to FIG. 6, seam 24 encloses a first alternate stiffening element 14a comprising a substantially planar cross-section having an axial length X and radial height Y. The first alternate stiffening element 14a has curved or warped side portions 26.

FIG. 7 shows a second alternate stiffening element 14b comprising an axial length X and radial height Y having side portions 26 that are outwardly bowed or convex-like in shape. Alternatively, side portions 26 may have an inwardly bowed or concave-like shape.

FIG. 8 shows a third alternate stiffening element 14c comprising an I-beam cross-section having axial length X, radial height Y and web thickness Z. An I-beam shaped stiffening element utilizes the stiffener material in a very efficient manner while maintaining the structural integrity of the duct along the radial direction.

In this disclosure and claims, the term substantially planar is used to describe the stiffeners illustrated in FIGS. 5, 6, 7 and 8. In the cases of FIGS. 6, 7 and 8 which illustrate stiffener cross-section that are not rectangular, axial width X of the cross-section at its widest point is still much less than radial height Y so that the ratio of Y/X preferably equals or exceeds 2.0.

While what has been shown and described herein constitutes a preferred embodiment of the subject invention, it should be understood that various modifications and adaptations of such embodiment can be made without departing from the present invention, the scope of which is defined in the appended claims.

What is claimed is:

1. A gas transporting flexible duct wherein said duct includes at least one helically wound strip of flexible material having leading and trailing edges and wherein, said leading and trailing edge of adjacent convolutions of said helically wound strip overlap one another and are bonded together to form a helical seam, said duct includes at least one stiffening element extending helically along said seam, said stiffening element having a cross-section with said cross-section having an axial length X and a radial height Y, and wherein the ratio of said radial height Y to said axial length X is greater than 1.0.

2. The duct of claim 1 wherein said ratio is greater than 2.0.

3. The duct of claim 1 wherein said ratio is greater than 3.0.

4. The duct of claim 1 wherein the cross-section of said stiffening element is substantially planar.

5. The duct of claim 1 wherein said stiffening element is metallic.

6. The duct of claim 1 wherein said stiffening element is non-metallic.

* * * * *